(12) United States Patent
Seine

(10) Patent No.: US 9,504,001 B2
(45) Date of Patent: Nov. 22, 2016

(54) LOCATION AWARE WIRELESS NETWORK ACCESS CONTROLLER

(71) Applicant: Verizon Deutschland GmbH, Dortmund (DE)

(72) Inventor: Martin Seine, Haltern am See (DE)

(73) Assignee: Verizon Deutschland GmbH, Frankfurt (DE)

( * ) Notice: Subject to any disclaimer, the term of this patent is extended or adjusted under 35 U.S.C. 154(b) by 155 days.

(21) Appl. No.: 14/268,844

(22) Filed: May 2, 2014

(65) Prior Publication Data

US 2015/0319730 A1 Nov. 5, 2015

(51) Int. Cl.
*H04W 4/00* (2009.01)
*H04W 64/00* (2009.01)
*H04W 4/02* (2009.01)
*H04W 48/04* (2009.01)
*H04W 84/12* (2009.01)

(52) U.S. Cl.
CPC ............ *H04W 64/00* (2013.01); *H04W 4/021* (2013.01); *H04W 48/04* (2013.01); *H04W 64/003* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 9,009,310 B1* | 4/2015 | DeRosia | 709/225 |
| 2010/0332615 A1* | 12/2010 | Short | H04L 63/08 709/217 |
| 2012/0284779 A1* | 11/2012 | Ingrassia, Jr. | G06F 21/70 726/5 |

* cited by examiner

*Primary Examiner* — Chi H Pham
*Assistant Examiner* — Fahmida Chowdhury

(57) ABSTRACT

A device may control a network based on the position of a client, and may be configured to determine a position of a client within the network. The device may determine whether the client is located inside a zone from a plurality of established zones based on the determined position of the client, and then identify a zone in which the client is located upon determining that the client is located inside one of the established zones. The device may apply a profile associated with the identified zone to the client, and then determine a logical network identifier for the client based on the identified zone. The network may appear to the client as an isolated network for the identified zone.

25 Claims, 8 Drawing Sheets

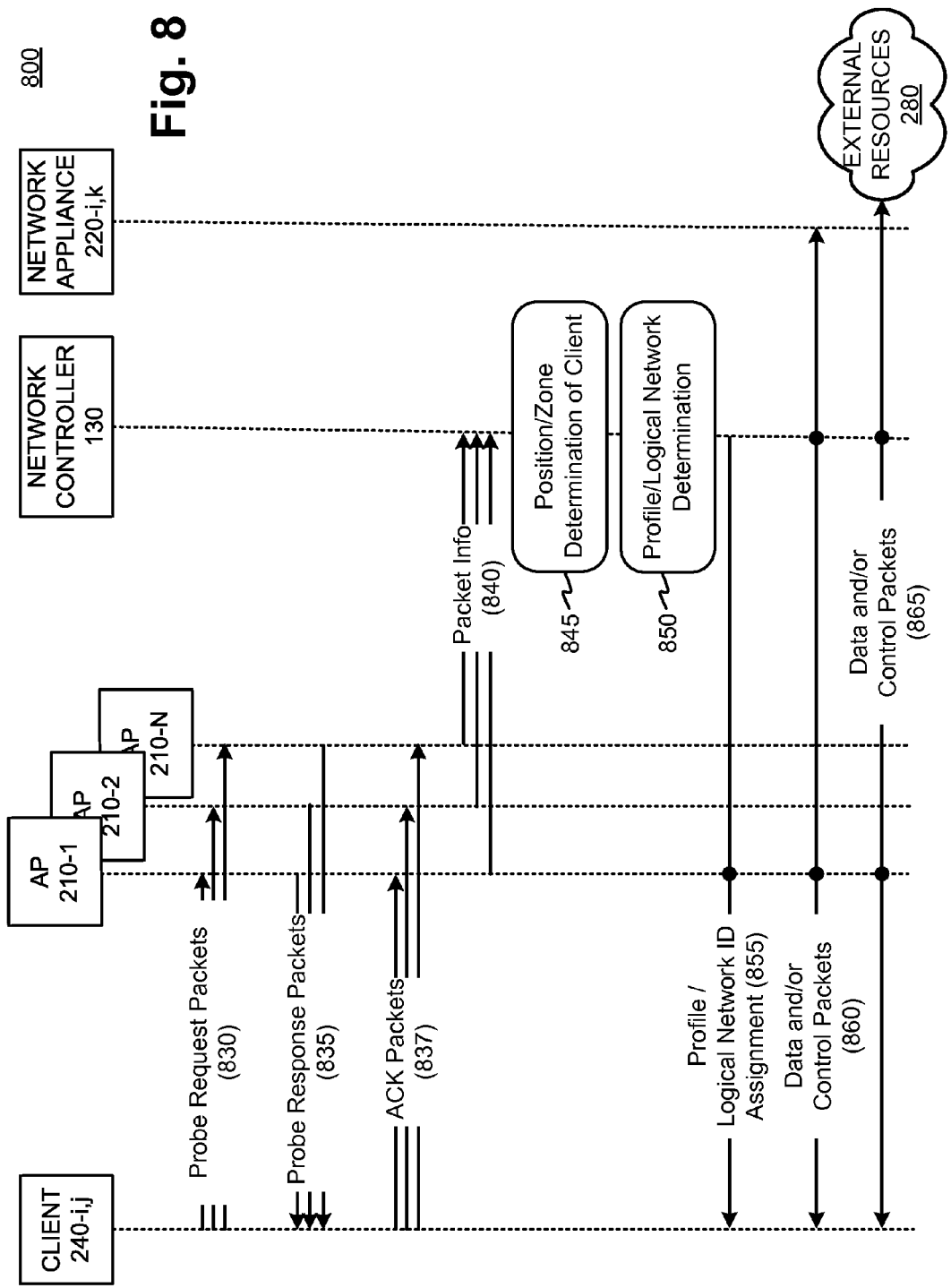

US 9,504,001 B2

LOCATION AWARE WIRELESS NETWORK ACCESS CONTROLLER

BACKGROUND

Modern wireless local area networks (LANs) offer convenient access to networking resources, particularly for environments where mobile clients such as, cell phones, tablets, and/or laptop computers, are prevalent. In public areas and/or other facilities in which groups can gather, such as, for example, conference rooms, meeting areas, and/or classrooms, wireless networking permits convenient and easily scalable access to network resources. Moreover, wireless networks further permit the control of network appliances, such as, projectors and/or whiteboard devices, which may be commonly found in the aforementioned settings. The effort for configuring clients, particularly in facilities having many areas using multiple wireless networks (e.g., universities, conference centers, etc.) and/or having multiple networked resources (e.g., wireless projectors), may be significant. Such efforts may entail the reconfiguration of clients as they move among different areas within a facility.

BRIEF DESCRIPTION OF THE DRAWINGS

FIG. 8 is a signal flow diagram showing exemplary messages passed between devices consistent with an embodiment presented herein.

DETAILED DESCRIPTION OF PREFERRED EMBODIMENTS

Figure 1:
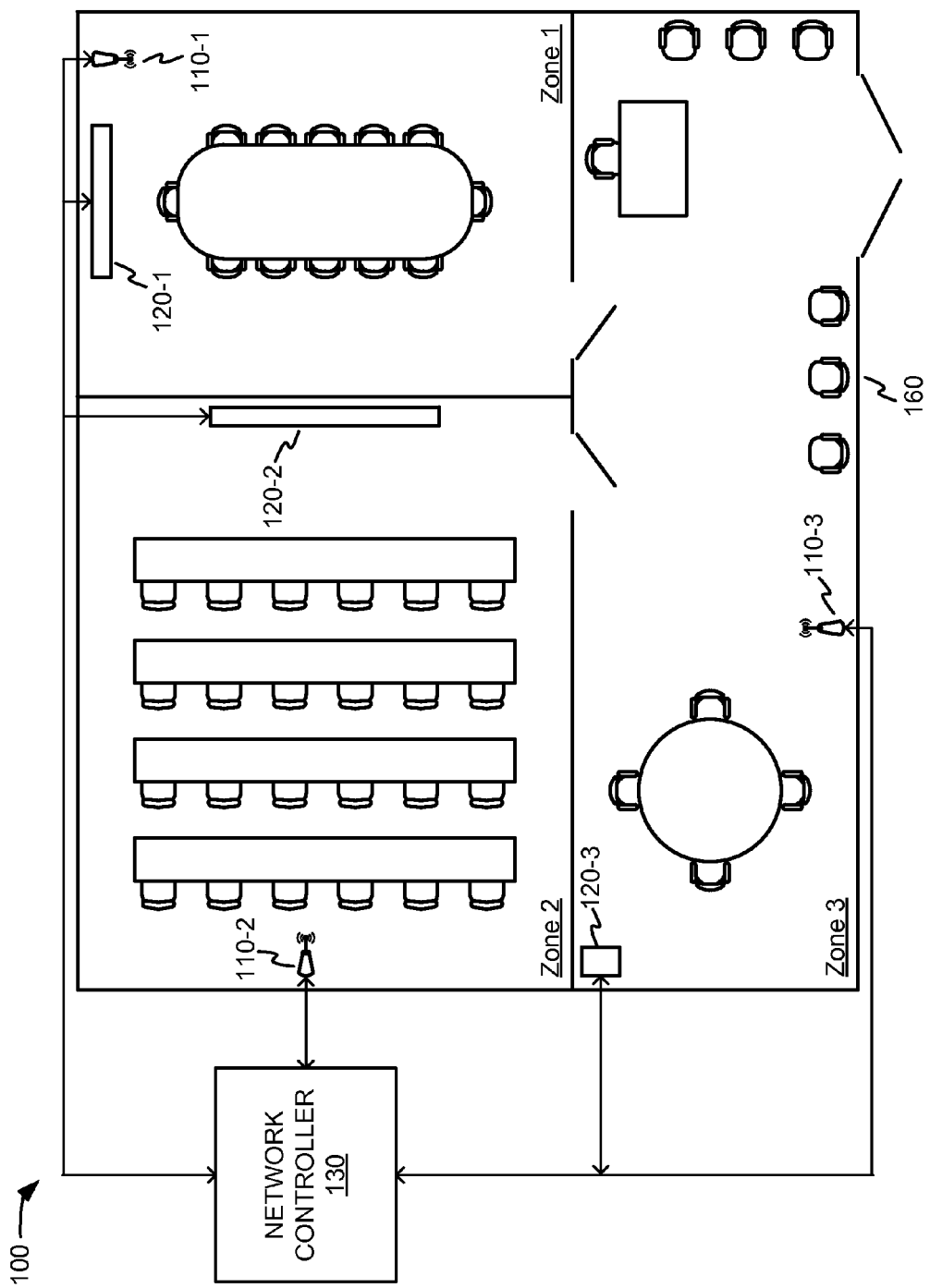
FIG. 1 is a diagram illustrating an exemplary environment consistent with an embodiment of a location aware network controller.

The following detailed description refers to the accompanying drawings. The same reference numbers in different drawings may identify the same or similar elements.

Unlike wired networks, where physical access to a LAN may be precisely controlled based on the location of network ports (e.g., RG-45 sockets), physical access to wireless networks may not be so easily constrained. Physical wireless LAN access can be affected by a number of different factors, such as signal and environmental characteristics. Thus, wireless LAN access can easily extend over nearby areas, even if they are separated by walls defining adjoining rooms, depending upon, for example, the configuration of the wireless access points and/or the materials used in the construction of the walls. For nearby or adjoining areas in which precise control over wireless LAN access is desired, systems and methods described herein may determine wireless LAN access based on the positions of clients within the areas of interest.

In an embodiment, a controller may identify zones within the wireless LAN where clients are located, and establish access controls for clients based upon the identified zones. The clients proximity to the zones may be determined by ascertaining the position of the clients. The zones may be selected from a plurality of pre-established zones defined by their positions. Based upon the identified zones, the controller may assign logical networks and/or apply profiles to the clients. Such profiles may be used in addition to conventional authentication techniques, thus permitting location-based access to the resources of the wireless network.

As used herein, a logical network is a network which appears to a client to be a single network, but may be an entity which is part of a larger network (or plurality of networks). A logical network may permit compartmentalization/isolation over a large network to conveniently administer the network, allocate resources, and/or enforce access permissions. A client having access to a logical network may, from the point of view of the client, appear to be in an isolated network. Network resources associated with other logical networks for which a client does not have access (i.e., "external network resources") will be unavailable to the client. Moreover, the client may not be able to detect or otherwise be made aware of the external network resources. In an embodiment, logical networks may be defined by appropriate Internet Protocol (IP) addressing schemes.

As used herein, a "zone" may be a predefined area within a wireless network that may be used to assign logical networks and/or apply profiles to clients. Zones may be defined, for example, based on position data describing the locations of their boundaries. A zone may be delineated by physical boundaries, such as, for example, the walls of a room. In other embodiments, zones may not have physical boundaries representing their demarcations.

As used herein, a "profile" is a data construct that may provide a set of rules relating to security that, when applied to a client, establish permissions to access resources within one or more logical networks and/or one or more wide area networks (such as, for example the Internet). Profiles may define permissions, for example, to control network appliances, allow access to local and/or wide area network servers, permit interaction with cloud resources, and/or receive information from network appliances. Profiles may be associated with one or more zones, and thus may provide the ability for clients to access network appliances without having to be manually configured by the user. Thus, upon entering a particular zone, the client may be automatically configured by the profile for accessing network appliances within the particular zone. The profile can make it unnecessary for a user to manually configure the client with a network ID (e.g., IP address) and/or the name of the network appliance in the zone.

As used herein, a "network appliance" may be any device which can access a network using a wireless and/or a wired connection. The network appliance may send and/or receive data from a client, and in some embodiments, can serve as an output device, an input device, or both. One example of an output device may be a large screen monitor which can be used to display presentations. An example of an input device may be a networked camera, which can provide a client with a video feed of a particular area for surveillance. Some devices, such as an electronic whiteboard, may serve as both an input and output device for a client. Other network appliances may send and receive data to clients, but may not be classified as Input/Output (I/O) devices. For example, in an industrial setting, a machine may include a network interface where it may receive commands from a client for control, or send status messages to the client regarding the state of the machine.

FIG. 1 is a diagram illustrating an exemplary environment 100 consistent with an embodiment of a location aware network controller. Environment 100 may include, for example, an educational facility for which floor plan 160 is shown. Floor plan 160 may include separate rooms providing different functions, each of which may be divided into separate zones. The zones may include wireless access points (APs) 110 (herein referred to collectively as "APs 110" and individually as "AP 110-*x*") and network appliances 120 (herein referred to collectively as "network appliances 120" and individually as "network appliance 120-*x*"). A network controller 130 may have wired connections to the access points 110 and/or the network appliances 120. However, other embodiments may include a wireless channel to connect network controller 130 with one or more access points 110 and/or network appliances 120. While environment 100 is shown as being divided into zones which correspond to floor plan 160, other embodiments may have zones which do not correspond to physical boundaries. Accordingly, as shown in FIG. 1, environment 100 includes zones having boundaries which correspond to the walls defining the rooms in floor plan 160.

Further referring to FIG. 1, Zone 1 may correspond to a conference room with a conference table as shown, and include wireless AP 110-1 and network appliance 120-1. Network appliance 120-1 may be a large screen monitor which can display presentations provided by a meeting attendee using a client. Zone 2 may correspond to a classroom with an exemplary array of chairs as shown, and include wireless AP 110-2 and network appliance 120-2. Network appliance 120-2 may be an interactive presentation device such as an electronic whiteboard, which may able to display data provided by a particular client having appropriate authorization. The electronic whiteboard may further receive commands provided by a student proximate to the whiteboard's surface to draw shapes and/or manipulate displayed objects. The visual information provided by the presenter and the student may be combined and sent to other clients belonging to students attending class in Zone 2. Zone 3, which can be a lobby having chairs and table(s) to accommodating individuals waiting for entry into the classroom in Zone 2 or the conference room in Zone 1. Zone 3 may include wireless AP 110-3 and network appliance 120-3. Network appliance 120-3 may be a network attached file server which provide materials which may be accessed prior to entering Zone 2 and Zone 3.

Network controller 130 can determine the position of each client within floor plan 160, and thus may be referred to as being "location aware." As will be described in more detail with respect to FIG. 6, network controller 130 may determine a client's position using the infrastructure of the wireless LAN. Additionally, the positions of one or more clients may be determined by the clients themselves (using, for example, on-board Global Positioning System (GPS) receivers), which then may be passed to network controller 130 for further processing. The positions received from the clients may be used instead of positions derived by network controller 130, or the received positions may be used in combination with the controller-derived positions to improve location accuracy.

Once the positions of the clients are determined, network controller 130 may identify the zone where each client is located. Network controller 130 may then apply profiles and assign logical network identifiers to the clients which are based on the identified zones. Each profile may define "location-based" access rights to the client based upon the client's identified zone. The logical network identifier may identify the client in a logical network which is dedicated to the identified zone. The logical network may thought of as a Virtual Local Area Network (VLAN) which confines each client's network access to the identified zone. Each profile may provide rules pertaining to the client's access to network appliances and/or other resources which are associated with the identified zone.

For example, referring to FIG. 1, if one or more clients are located in the conference room which defines Zone 1, network controller 130, through wireless AP 110-1, may assign profiles and logical network identifiers allowing clients within Zone 1 to interact with network appliance 120-1, and further may define restrictions preventing access to network appliances and/or other resources associated with Zone 2 and/or Zone 3 (e.g., network appliance 120-2 and/or 120-3). For clients which are located in the classroom in Zone 2, network controller 130, through wireless AP 110-2, may assign profiles and logical network identifiers to clients within Zone 2 so they may access network appliance 120-2 (e.g., electronic whiteboard) without requiring clients to know the name and/or ID of the resources included in Zone 2, but may be restricted from accessing network appliances 120-1 and 120-3 simply by virtue of network appliances 120-1 and 120-3 being in a different zone. For clients located in Zone 3, network controller 130, through wireless AP 110-3, may assign profiles and logical network identifiers to clients within Zone 3 so they may access network appliance 120-3 (e.g., network file server), but may be restricted from accessing network appliances 120-1 and 120-2.

For example, with respect to Zone 2, clients could be tablets and/or laptop computers used by students attending a class within the classroom. A presentation held by an instructor using network appliance 120-2 (which may be a virtual whiteboard) could then be seen by the students within the class, where information presented via network appliance 120-2 may be provided to the client devices in Zone 2 wirelessly over LAN 200. However, clients outside Zone 2 would not have access to network appliance 120-2, and thus clients in other adjoining rooms in different zones (e.g., Zones 1 and 3) would not experience any interference. In another embodiment, network controller 130 may be specifically configured to permit particular clients located outside the classroom of Zone 2 to access network appliance 120-2, and thus permit students not able to attend the classroom session the opportunity to remotely participate with the class using the same network appliance 120-2, while maintain separation among the clients located in different zones.

In some embodiments, a profile may permit a client to access specific resources in more than one zone. That is, a profile may permit the client to access specific resources outside of a zone in which it is located. This designation can be based on creating a logical association between zones and storing this association in a profile. For example, a profile associated with an identified zone may be associated with one or more other zones, thus allowing client access to the other zones by the association defined in the profile. With reference to FIG. 1, for example, clients within Zone 1 may receive profiles allowing access to network appliance 120-3 (e.g., the network attached file server). For participants in the conference room in Zone 1, access to information on network appliance 120-3 may facilitate meetings, and access may be accordingly granted through the profile provided by network controller 130. However, access to information on a network access server may prove distracting to the students in the classroom of Zone 2, and thus the profiles received by the clients in Zone 2 will not have access to the resources in Zone 3. Moreover, access to resources based on a client's identified zone is not necessarily restricted to resources within the zone. For example, clients in the conference room of Zone 1 may receive profiles permitting access to the Internet. However, clients in the classroom of Zone 2 may receive profiles preventing access to the Internet, or permitting restricted access only to sites relating to the subject being taught in class and/or administrative aspects of the class itself.

In addition to the location-based access control, network controller 130 may also provide traditional network authentication to clients determined by non-location based profiles. The non-location based profiles may be applied using conventional techniques, such as, for example, based on the user name and password associated with the client. The non-location based profiles can provide another layer of authentication which may be used together with location based access control. For example, in the classroom of Zone 2, the non-location based profile for a client associated with a student may not have control of network appliance 120-2 (e.g., electronic whiteboard), but the non-location based profile of an instructor will grant the instructor's client complete control of the network appliance 120-2.

Additionally, if network controller 130 determines that a client without any authentication credentials to the network is located outside of all of the known zones, network controller 130 may apply a "guest" profile to the client. In this case, for example, the guest profile may permit a client to connect to Internet services, but may be restricted from accessing any other resources within the educational facility. However, for clients outside of all of then known zones which have authentication credentials for the educational facility (e.g., employees), access to network resources within zones may be restricted, but other resources which are not subject to location based access control would be made available.

Network appliances 120 and/or wireless AP 110 may be connected to a wired network as shown in FIG. 1, however, in other embodiments, one or more network appliances 120 may communicate with the network wirelessly. Alternatively, wireless repeaters may be used in place of one or more wireless APs 110. Moreover, as shown in FIG. 1, each zone may include a separate wireless AP (110-1, 110-2, 110-3), however in other embodiments, a zone may not require its own wireless AP 110 if signal strength within the zone is sufficient and the other wireless APs 110 are appropriately spaced to determine a position of a client with enough accuracy to identify the zone in which it resides.

Figure 2:
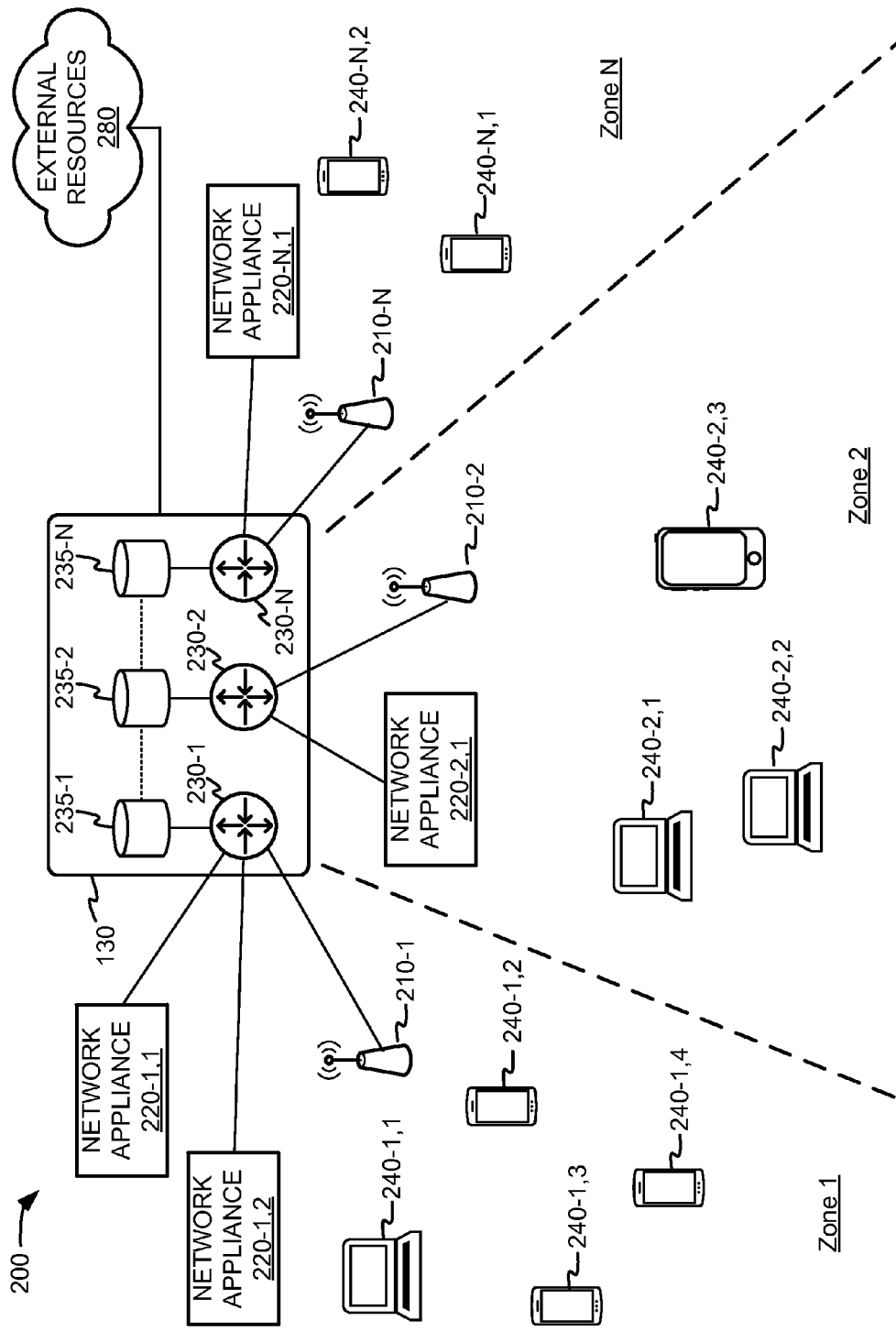
FIG. 2 is a diagram illustrating an exemplary network consistent with an embodiment of a location aware network controller.

FIG. 2 is a diagram illustrating an exemplary local area network (LAN) 200 consistent with an embodiment of a location aware network controller 130. LAN 200 may include both wired and wireless networks where access control is performed by network controller 130. LAN 200 may include wireless APs 210 (herein referred to collectively as "APs 210" and selectively as "AP 210-$i$," where $i$ is an index identifying zone), network appliances 220 (herein referred to collectively as "network appliances 220" and selectively as "network appliances 220-$i,j$," where "$i$" is an index identifying zone, and "$j$" is a unique index for each network appliance in Zone "$i$"), and clients 240 (herein referred to collectively as "clients 240" and selectively as "clients 240-$i,j$," where "$i$" is an index identifying zone, and "$j$" is a unique index for each client in Zone "$i$").

LAN 200 may be divided into a plurality of zones: Zone 1-Zone N. Each zone may be predefined based on positions which may be described by coordinates in a local coordinate system (which may be determined, for example, using building floor plans, local landmarks, standard surveying techniques, etc.) and/or standard coordinate systems, such as, for example, WGS84, which may be determined using standard techniques with GPS receivers, and/or using differential GPS for greater accuracy. As illustrated in the embodiment shown in FIG. 1, the zones may correspond to walls defining rooms in a building. In other embodiments, the zones may be divided in a manner which does not correspond to structural objects such as walls. Accordingly, various embodiments may be used to provide location based access control in outdoor environments. Zones not corresponding to structural objects may be demarcated using markers to alert users to zone boundaries. Alternatively, in some embodiments, the zones may not be marked, and thus their boundaries would not be obvious to users operating clients within a zone.

Network controller 130 may perform a variety of control functions for both wired and wireless networks, and may further serve as a bridge between other network(s). For example, network controller 130 may provide clients 240 access to both a wireless LAN and a wired LAN, and provide additional access to one or more wide area networks (e.g. external resources 280) through one or more LANs. As exemplified in FIG. 2, network controller 130 may divide a single wireless LAN into multiple logical networks, where the logical networks may correspond to various zones. For example, in the embodiment shown in FIG. 2, each Zone $i$ may uniquely correspond to a logical network, and include a wireless AP 210-$i$ to provide wireless connectivity to all clients 240 in Zone $i$. The position of clients 240 may be determined by network controller 130. Once the client 240 positions are determined, network controller 130 may identify the zones where the clients are located and "place" them in the proper logical network.

Accordingly, as shown in FIG. 2, network controller 130 may establish N logical networks corresponding to N zones, where a logical network may have a one-to-one correspondence with a distinct zone. Using logical networks in this manner may conveniently facilitate the compartmentalization of the wireless LAN, where network resources and/or access permissions may be easily and automatically configured for the clients 240 based upon the zone in which a particular client 240-$i,j$ is located. For example, clients 240-1,1:4 (where the notation "240-1,1:4" is an abbreviated form of 240-1,$j$, where $j$=1, . . . ,4) may wirelessly access network appliances 220-1,1:2, but would not be able to access network appliance 220-2,1 or network appliance 220-N,1. Clients 240-2,1:3 may wirelessly access network appliance 220-2,1, but would not be able to access network appliances 220-1,1:2 and network appliance 220-N,1. Clients 240-N,1:2 may wirelessly access network appliance 220-N,1, but would not be able to access network appliances 220-1,1:2 and network appliance 220-2,1. Additionally, profiles may be based on zones and may be used as a basis to control client access to both internal resources within the zones, and/or external resources outside the zones. External resources 260 may include, for example, the Internet, access to cloud-based resources, interaction with private social networks, access to network attached devices, access to other high security networks (e.g., financial transactions, defense information etc.), business sensitive information, medical records, etc.

In an embodiment, clients 240 may be associated with logical networks by assigning appropriate logical network identifiers to clients 240 based upon the zone in which clients 240 are located. For example, with networks that use Internet Protocol version 4 (IPv4) in the network layer (Layer 3 in the OSI model), network controller 130 may divide the N logical networks by assigning each zone a unique range of IP addresses. Using Dynamic Host Configuration Protocol (DHCP), network controller 130 may assign an IP address selected from the appropriate range of IP addresses which correspond to the zone in which the client is located, and within that range of IP addresses, route packets between clients and network appliances. Access to IP addresses in ranges associated with other zones is prevented by the controller, thus compartmentalizing wireless LAN access to within each zone. The aforementioned functionality of network controller 130 may be exemplified as shown in FIG. 1, where network controller 130 uses N routers 230 associated with the zones, each router 230-$i$ directing packets within its respective Zone i. Each router 230-1:N may use IP addresses assigned respectively by DHCP servers 235-1:N, where each DHCP server 235-$i$ provides the range of IP addresses associated with its respective Zone i. The DHCP servers 235 are shown as being connected by a dotted line in FIG. 2 to signify that the IP addresses are part of a common wireless network that assigns addresses from a common address space, and are merely segregated into separate ranges to establish the logical networks associated with the zones. Thus, by segregating the addressing for Zone i into separate ranges dictated by DHCP server 235-$i$, and by routing packets using router 230-$i$ which is dedicated to Zone i, a logical network may be established to achieve compartmentalization of clients within Zone i using a wireless LAN which is common to all Zones 1:N. It should be noted that the routers 230-1:N and DHCP servers 235-1:N may not be realized in physical hardware and/or implemented using separate hardware units. The depiction of network controller 130 shown in FIG. 2 emphasizes functional aspects directed to an embodiment, which may be implemented by programmable logic units (e.g., ASICs), a processor in conjunction with software and/or firmware, dedicated hardware, or any combination thereof. Network controller 130 may perform other conventional network operations for LAN 200 in addition to being configured to perform location based access control.

In the description above, an embodiment was described which assigned logical network identifiers in the context of IPv4 networks, which is described in more detail below in relation to FIG. 7. In other embodiments using different Layer 3 protocols, logical networks may be assigned to clients using a different mechanism. For example, when IPv6 is being used in the network layer, router 230-$i$ will have a unique address and may send out a router advertisement (e.g., ICMPv6 type 134) periodically and/or instantly every time the network controller 130 identifies a new client allocation to Zone i. The client 230-$i,j$ may then determine the appropriate router for obtaining wireless access to LAN 200. In other embodiments, the logical networks may be assigned using different OSI layers. For example, network controller 130 may assign logical networks based on Layer 2 switching, where Media Access Controller (MAC) address switching and/or filtering may be used to assign logical networks to clients 240 based on the zones where clients are located. Logical network addressing on MAC layer (OSI Layer 2) may be enhanced with addressing, for example, according to IEEE 802.1q or other applicable technologies, to extend beyond network controller 130.

In various embodiments, LAN 200 may wirelessly provide network connectivity to clients 240 through APs 210. Accordingly, each zone may include within its boundaries a separate access point. However, in other embodiments, a particular zone may not require an access point to reside within its boundaries if signal strength within the particular zone is sufficiently served by an access point lying exterior to that zone. Specifically, referring to FIG. 2, each Zone i may be associated with at least one AP 210-$i$. However, in some embodiments, an access point may not be present within a particular zone (e.g., Zone j), and thus may share an access point (e.g., AP 210-$i$) with another zone (e.g., Zone i). In such a case, functionally speaking, AP 210-$i$ may be connected to more than one router (e.g., router 230-$i$ and router 230-$j$). In such an embodiment, compartmentalization/separation of each zone (e.g., between Zone i and Zone j) may be maintained by using separate routers (e.g., 230-$i$ and 230-$j$) and separate DHCP servers (e.g., 235-$i$ and 235-$j$) over a shared physical channel provided by a single access point (AP 230-$i$). The separation between zones may be achieved by enhancing addressing of data packets on the physical channel according to the zone in which a client 230-$i,j$ is located. Alternatively, a protocol may be used to transport traffic in an encapsulated manner between AP 230-$i$ and controller 130, which allows controller 130 to transmit data packets according to the profile associated with the zone. One exemplary protocol which may be used in this manner may be, for example, the Control And Provisioning of Wireless Access Points (CAPWAP) protocol. Additionally, it should be noted that if the APs 210 are also being used to determine positions of clients 240, APs 210 may be appropriately placed throughout LAN 200 without requiring each zone to include one or more APs 210, so that the positions of clients 240 may be determined with enough accuracy to identify the zones in which clients 240 reside.

LAN 200 may include one or more wireless networks based upon wireless standard(s) which are appropriate for the environment in which LAN 200 is deployed. Such standards may include, for example, Wi-Fi® (e.g., any IEEE 802.11(x) network, where (x)=a, b, g, n, ac, ad, etc.), ZigBee, etc. LAN 200 may further include personal area network protocols such as, for example, Bluetooth LE. While LAN 200 is described above as a local area network, in some embodiments, appropriately configured wireless Wide Area Network (WAN) standards and/or protocols may also be used to provide connectivity to clients 240. Such wireless networks may include WiMAX IEEE 802.16 metro networks, mesh networks (e.g., IEEE 802.11s), and/or cellular networks, such as, for example, 3GPP, and/or 3GPP2 based networks.

Location based network control may be used in any environment and/or application where convenient wireless networks access control may be used, and is thus not restricted to environments exemplified in FIG. 1. Embodiments may be used in indoor and/or outdoor environments. For example, location based access control may be used in medical care environments, such as hospitals, and could be deployed, for example, in patient rooms, intensive care units, operating rooms, etc. In medical environments, medical care professionals may use clients 240 to access medical devices within a space proximate to a patient, and not interfere with other medical devices of patients in adjoining rooms. Such access may include, for example, receiving data from patient monitoring equipment (e.g., EKG machines, blood oxygen, etc.), controlling patient monitoring equipment, and/or controlling medical equipment used in patient therapy. For example, a doctor using a tablet may wirelessly receive data from an EKG monitor on a tablet, adjust the EKG monitor wirelessly from the tablet to better display the EKG signals, and then control the flow rate on an intravenously administered drug using the tablet. Because the patient's room may be treated as a separate zone by network controller 130, the doctor's tablet will only control devices within the patient's room, and not access nor control medical devices in other rooms.

In another embodiment, wireless access to networked resources within a secure room or an access controlled area, which may be protected by physical access restrictions (e.g., cipher-locked doors, etc.), can be made more secure using location based access control. For example, a zone may be designated by the boundaries of the secure room, or only to designated subareas within the secure room. Only clients which are physically in the designated zone may access the network resources (e.g., a server storing classified data), and clients outside the zone will have no access, nor will see any evidence of the server's presence, on the network for which clients' have access. Accordingly, location based access control may add an additional layer of security for wireless access, as only clients having physical access to the secure room may access resources residing therein. In another embodiment, wireless access to remote monitoring devices such as cameras and/or microphones may be subject to the associated physical security restrictions of a monitoring room. Thus, only clients within the monitoring room may allow clients to wirelessly access and/or control remote monitoring devices.

In another embodiment, wireless clients may be used to monitor and control industrial equipment for manufacturing in a factory, or infrastructure-related equipment (e.g., heating, ventilation, and air conditioning (HVAC), electrical, communications, water supply, etc.) in a maintenance area for a building. In such an environment, zones may be established around particular work areas (which may not be separated by walls) on the factory floor or within a maintenance room. Only clients residing in a particular work area may monitor and/or control equipment residing within the particular work area. Clients 240 outside the particular work area would not have access to the equipment in the particular work area, thus preventing a client's inadvertent monitoring/control of a machine outside the work area. Accordingly, a client's access to machines on the factory floor or within a maintenance room may be automatically granted as the particular work area is entered, and automatically rescinded as when the client leaves the particular work area. Thus access control may be conveniently provided for by the network controller 130 as the client moves around the factory floor or maintenance room from one work area to another.

In another embodiment, location based access control may be used within a condominium (condo) or apartment building to permit tenants to conveniently control various appliances (e.g., kitchen, television, stereo, etc.) and/or infrastructural devices such as indoor and outdoor light switches, smoke detectors, thermostats and/or HVAC equipment, security alarms, etc., within an apartment. Each condo or apartment could be serviced by a common wireless network provided by the apartment complex or maintenance association, and location based access control may be provided based on establishing zones delineated by the boundaries of each apartment or condo. The appropriate clients 240 associated with tenants may be permitted to control devices and services within their own apartment or condo, but would not be able to access (or even detect or otherwise be aware of) devices and services in other tenants' apartments or condos.

In another embodiment, location based access control may be used in any type of vehicle, such as, for example, cars, trucks, boats, planes, recreational vehicles, etc., to control access to various sensors and devices for receiving data and/or controlling equipment within the vehicle. Such vehicles may be equipped with multiple antennas, so that client positions may be determined with sufficient accuracy (e.g., to centimeters). Once the position of the client within the vehicle is determined, access may be controlled based on zones within the vehicle. Access may be provide to facilitate operation of the vehicle by granting access to sensors and/or devices for control, grant various resources (e.g., entertainment) based on seating position, or by restricting access or client functionality to improve safety. For example, within an automobile, RV, truck, plane, boat etc., occupants, based on their seated positions, may be granted access to audio and/or video streams and controls, so the at clients may control entertainment devices and/or receive content (prerecorded movies, music, etc.) based on their position. This may be performed automatically based on the seating location of the occupant, and can be reconfigured automatically when the occupants change seating locations. In another embodiment, during the operation of large vehicles or other equipment (e.g., construction equipment, boats, aircraft, cranes, etc.) which may require multiple operators and/or assistants to operate safely, clients 240 may receive different audio/video feeds depending upon their position to assist in the operation of the vehicle. For example, clients 240 being used by ship-mates which may receive appropriate video feeds, depending upon their position on the ship, in order to carefully monitor the ship's progress when docking and/or exiting and entering a harbor. In another embodiment, passengers on a plane may be provided control of entertainment during a flight based on their seating position, where clients 240 may control and receive audio and/or video content, may call for assistance from a stewardess, etc.

In another embodiment, location based access control may be used in food service establishments such as, for example, dining areas and/or food courts, to access menus from different providers, select orders, and/or provide payment to the vendor based on the customers' location within the food court. Additionally, food court operators may monitor lines (e.g., wait times) and automatically provide sales incentives, such as coupons, to prevent patrons from exiting a line during a period when service is slow.

In another embodiment, location based access control may be used in airports to facilitate check-in processing and/or boarding at the gate, interaction with automated stations and/or kiosks for express check-in or for obtaining information, etc. In another embodiment, zones may be established around airport lounges and/or clubs so exclusive patrons may be afforded premium access to services while waiting for a flight, while those outside the lounge would not have access, or even be aware of, such premium services. Alternatively, clients may be used by airport employees to control and obtain video feeds from cameras within a local area, control security devices, computers, locks, etc.

In any environment where a compartmentalization of a wireless network based upon position may be useful, location based access control may be used to manage access to resources associated with the network. Such uses may include, but are not limited to: malls or other stores; waiting areas of any type (e.g., automotive service location or dealership); and museums and/or other tourist attractions (e.g., use in automated guided tours).

Clients 240 may include any type of electronic device having wireless communication capabilities, and thus may communicate over LAN 200 using a variety of different wireless channels. A client 240-$i,j$ may include, for example, a smart phone, a tablet, a laptop computer, a cellular phone, any type of wireless IP communications device, a Voice over Internet Protocol (VoIP) device, a gaming device, a media player device, or a digital camera that includes wireless communication capabilities.

Network appliances 220 may include any type of electronic device having a wired (as shown in FIG. 2) and/or a wireless connection (not shown) to network controller 130. Network appliance 220-$i,j$ may include any type of input device (e.g., camera, microphone, any form of sensor, security devices, environmental monitors, etc.), any type of output device (e.g., monitor, projector, media player, audio controller, etc.), or combination thereof (e.g., network attached storage device, an electronic whiteboard, etc.). In generally, network appliances 220 may include any type of machine or device which may be monitored and/or controlled wirelessly over a network. Accordingly, network appliances 220 may include, for example, medical devices, machines used in manufacturing, machines used in food production and/or agriculture, etc.).

Figure 3:
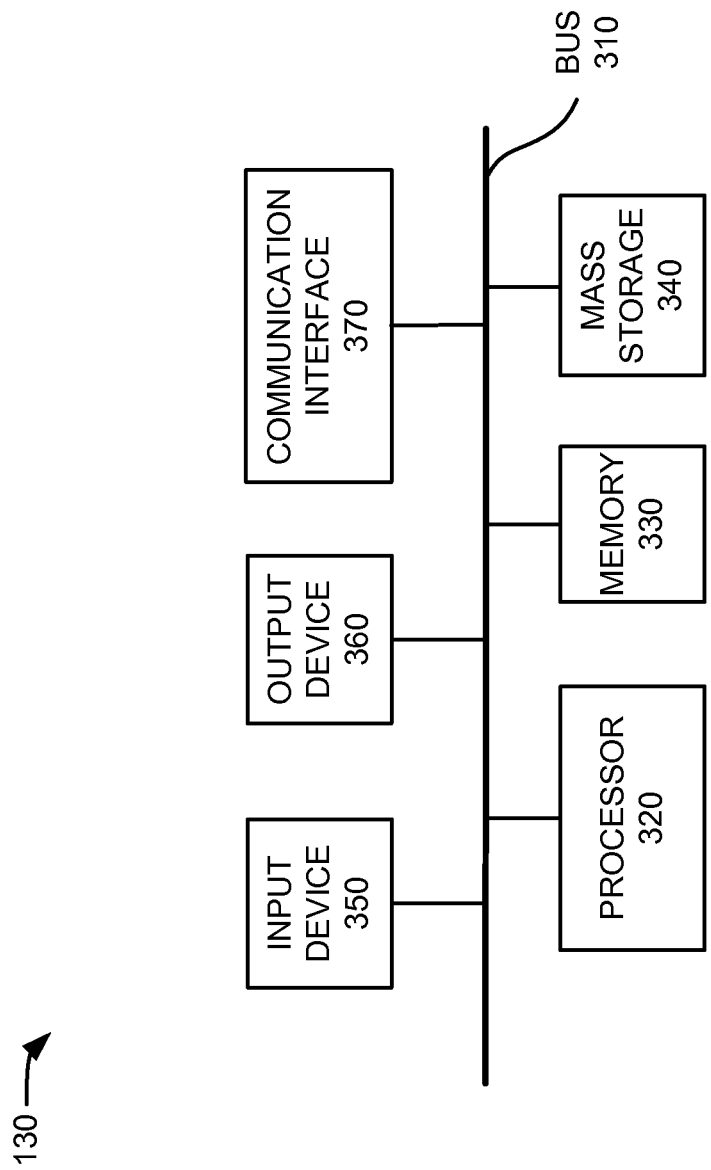
FIG. 3 is a block diagram showing exemplary components of a network controller.

FIG. 3 is a block diagram showing exemplary components of network controller 130. Network controller 130 may include a bus 310, a processor 320, a memory 330, mass storage 340, an input device 350, an output device 360, and a communication interface 370. Other devices operating in LAN 200, such as client devices 240 and network appliances 220 may be configured in a similar manner.

Bus 310 includes a path that permits communication among the components of network controller 130. Processor 320 may include any type of single-core processor, multi-core processor, microprocessor, latch-based processor, and/or processing logic (or families of processors, microprocessors, and/or processing logics) that interprets and executes instructions. In other embodiments, processor 320 may include an application-specific integrated circuit (ASIC), a field-programmable gate array (FPGA), and/or another type of integrated circuit or processing logic. For example, the processor 320 may be an x86 based CPU, and may use any operating system, which may include varieties of the Windows, UNIX, and/or Linux. The processor 320 may also use high-level analysis software packages and/or custom software written in any programming and/or scripting languages for interacting with other network entities are communicatively coupled to LAN 200 and/or external resources 280.

Memory 330 may include any type of dynamic storage device that may store information and/or instructions, for execution by processor 320, and/or any type of non-volatile storage device that may store information for use by processor 320. For example, memory 330 may include a RAM or another type of dynamic storage device, a ROM device or another type of static storage device, and/or a removable form of memory, such as a flash memory. Mass storage device 340 may include any type of on-board device suitable for storing large amounts of data, and may include one or more hard drives, solid state drives, and/or various types of RAID arrays.

Input device 350, which may be optional, can allow an operator to input information into network controller 130, if required. Input device 350 may include, for example, a keyboard, a mouse, a pen, a microphone, a remote control, an audio capture device, an image and/or video capture device, a touch-screen display, and/or another type of input device. In some embodiments, network controller 130 may be managed remotely and may not include input device 350. Output device 360 may output information to an operator of network controller 130. Output device 360 may include a display (such as an LCD), a printer, a speaker, and/or another type of output device. In some embodiments, network controller 130 may be managed remotely and may not include output device 360.

Communication interface 370 may include a transceiver that enables network controller 130 to communicate (both wired and/or wirelessly) within LAN 200 and access external resources 280 over an external network, such as, for example, the Internet. Specifically, communication interface 370 may be configured for wireless communications (e.g., Radio Frequency (RF), infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 370 may include a transmitter that converts baseband signals to RF signals and/or a receiver that converts RF signals to baseband signals. Communication interface 370 may be coupled to one or more antennas for transmitting and receiving RF signals. Communication interface 370 may include a logical component that includes input and/or output ports, input and/or output systems, and/or other input and output components that facilitate the transmission/reception of data to/from other devices. For example, communication interface 370 may include a network interface card (e.g., Ethernet card) for wired communications and/or a wireless network interface (e.g., a WiFi) card for wireless communications. Communication interface 370 may also include a Universal Serial Bus (USB) port for communications over a cable, a Bluetooth® wireless interface, a Radio Frequency Identification (RFID) interface, a Near Field Communication (NFC) wireless interface, and/or any other type of interface that converts data from one form to another form.

As described below, network controller 130 may perform certain operations relating to location based access control for a wireless LAN. Network controller 130 may perform these operations in response to processor 320 executing software instructions contained in a computer-readable medium, such as memory 330 and/or mass storage 340. The software instructions may be read into memory 330 from another computer-readable medium or from another device. The software instructions contained in memory 330 may cause processor 320 to perform processes described herein. Alternatively, hardwired circuitry may be used in place of, or in combination with, software instructions to implement processes described herein. Thus, implementations described herein are not limited to any specific combination of hardware circuitry and software.

Although FIG. 3 shows exemplary components of network controller 130, in other implementations, network controller 130 may include fewer components, different components, additional components, or differently arranged components than depicted in FIG. 3.

Figure 4:
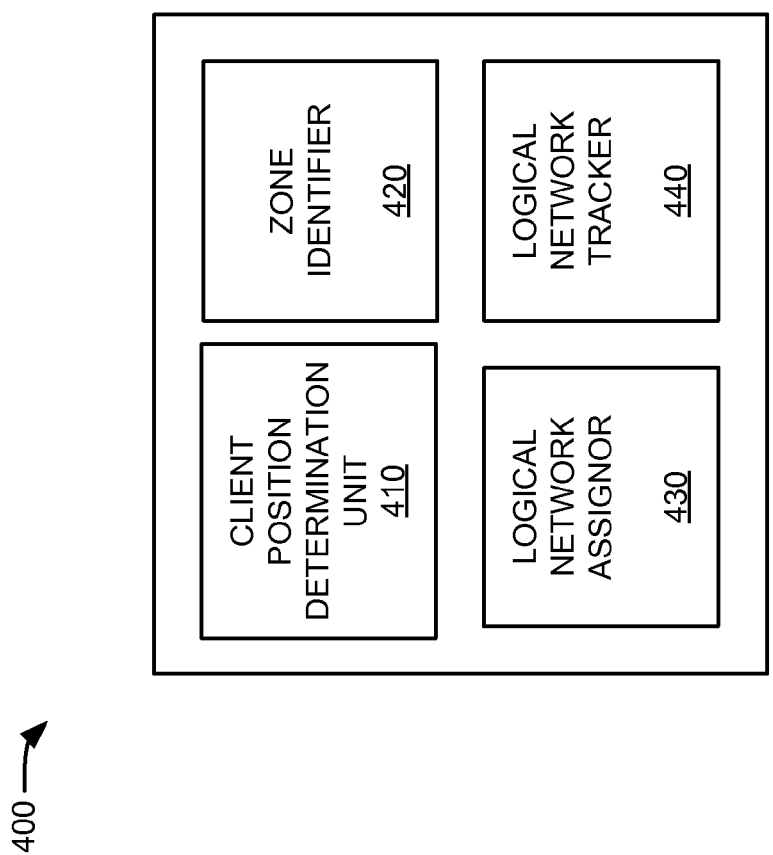
FIG. 4 is a block diagram of exemplary functional components of a network controller.

FIG. 4 is a block diagram of exemplary functional components 400 a network controller 130, which may include a client position determination unit 410, a zone identifier 420, a logical network assignor 430, and a logical network tracker 440. Functional components 400 may be implemented as hardware, computing instructions (e.g., software) executed by a processor (e.g., processor 320), which are tangibly embodied on a computer-readable medium, or a combination thereof configured to perform one or more of the processes described herein. In certain embodiments, functional components 400 may be implemented as a software application embodied on a computer-readable medium, such as memory 330 and/or mass storage device 340, configured to direct processor 320 to execute one or more of the processes described herein.

Client position determination unit 410 may be configured to determine the positions of clients 240 within the wireless LAN. Client position determination unit 410 may determine the positions of clients 240 based on measured signal characteristics of the wireless signal used for network communications (as will be described in detail below with respect to FIG. 6). For example, position of clients 240 may be determined by measuring time delays and/or signal strengths associated with packets that are wirelessly transmitted and received. In other embodiments, clients 240 may provide their positions to network controller 130 if clients 240 have a position determination capability, such as, for example, the ability to receive and process GPS signals. In other embodiments, position data of clients 240 obtained from different sources may be combined to improve accuracy. Once positions of clients 240 are determined, client position determination unit 410 may also track the positions of clients 240 over time, and be able to dynamically determine, in real time or near real time, when clients 240 move from one zone to another.

Zone identifier 420 may be configured to establish zones within LAN 200 and then identify zones in which clients 240 reside. Zones may be establish prior to performing location based access control, and may be added, updated, and/or modified as desired. Each zone may define the position of the borders for each zone. The zones may be established in accordance with any area of interest where location based access control is desired. For example, zones may be established for conference rooms, briefing rooms, waiting rooms, medical treatment rooms and/or other facilities, educational facilities including classrooms, and/or areas within a manufacturing facility. The position of the zone borders may be defined in a standard coordinate system or a locally defined one. The zone borders may be represented in memory and processed using known techniques, such as, for example approximating borders with mathematical functions, vectors, using look-up tables, etc. The identification of a zone in which a client 240 resides may be performed by comparing the position of the client 240 with the position boundaries of the zones.

Logical network assignor 430 may assign appropriate logical network identifiers to clients 240 once zone identifier 420 determines the zone in which clients 240 reside. Logical network assignor 430 may assign logical network identifiers to the client 240, and may further apply profiles to clients 240 based upon zone identification and/or other identifying information associated with each client 240. In one embodiment, logical network assignor 430 may assign IP addresses to clients 240 based on their identified zone, as described below in relation to FIG. 7 where IPv4 may be used.

Logical network tracker 440 may keep a history of logical network identifiers for clients 240s, and may further be used to ascertain when to a reassign logical network identifiers when a client 240-$i,j$ moves from one zone to another. For example, logical network tracker 440 may determine that a client was not previously assigned a logical network identifier. In such a case, when a request is received from the client for a network identifier, logical network assignor 430 will assign the logical network identifier to the requesting client. Logical network tracker 440 may be used when it is determined a client 240-$i,j$ moves from a current zone to second zone. Here, logical network tracker 440 may revoke the assigned logical network identifier and assigned profile for client 240-$i,j$, and have logical network assignor 430 assign a new logical network identifier and apply a new profile associated with the second zone. In order to effectively utilize network resources, when logical network tracker 440 determines that a logical network identifier associated with the second zone was previously assigned to a client 240-$i,j$, it may reassign the previously assigned network identifier and reapply the profile associated with the second zone. Whenever such a reassignment or new assignment occurs, the logical network tracker 440 may also be responsible for revoking the previously assigned network identifier and/or previously applied profile which not associated with the zone in which client 240-$i,j$ has moved into.

Although FIG. 4 shows exemplary functional components of network controller 130, in other implementations, network controller 130 may contain fewer, different, differently arranged, or additional functional components than depicted in FIG. 4. In still other implementations, a functional component of network controller 130 may perform one or more tasks described as being performed by another functional component of network controller 130.

Figure 5:
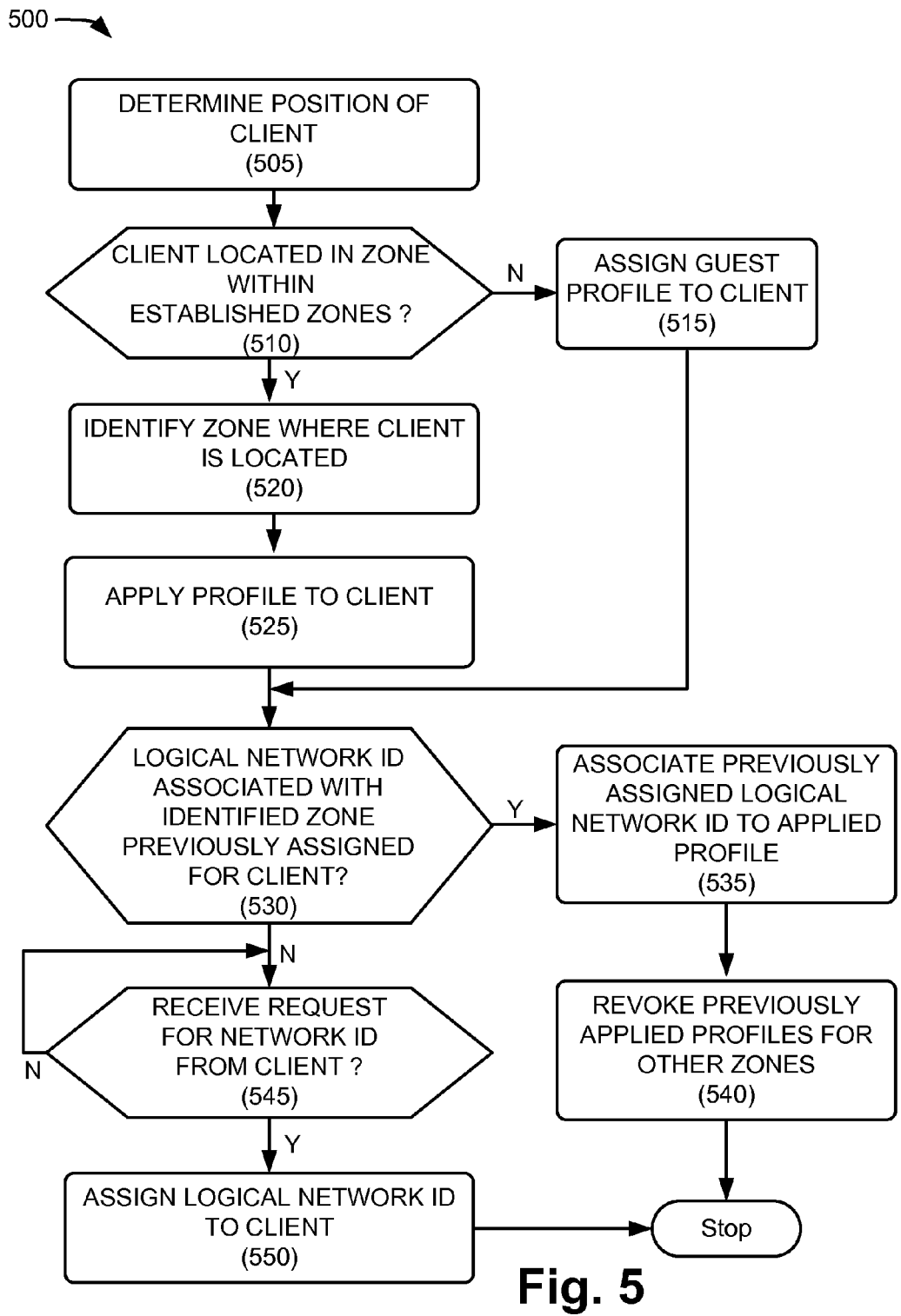
FIG. 5 is a flow diagram of an exemplary process associated with a network controller.

FIG. 5 is a flow diagram of an exemplary process 500 for location based access control. Process 500 may be performed by network controller 130, for example, by executing instructions on processor 320 which may be stored in memory 330. For ease of explanation, process 500 is described below in relation to operations associated with a single exemplary client 240-$i,j$. However, it should be noted that process 500 may be performed in association with any number of clients 240, including all of the clients 240 operating in LAN 200, or any subset thereof, depending upon the configuration of network controller 130 and/or clients 240.

Initially, network controller 130 may determine a position of client 240-$i,j$ in LAN 200 (Block 505). The positions of the clients may be determined using any known technique, for which the details of one approach are described below in relation to FIG. 6. Once the position of a client 240-$i,j$ is known, network controller 130 may determine whether client 240-$i,j$ is located inside a zone belonging to the plurality of established zones defined within network controller 130 (Block 510). If not, that is, if it is determined that client 240-$i,j$ is located outside of the established zones, network controller 130 may apply a guest profile to the client (Block 515). The guest profile may provide client 240-$i,j$ limited access to network resources (e.g., such as, for example, access to a facilities public LAN, website, and/or Internet access).

If it is determined that client 240-$i,j$ is located inside an established zone in Block 510, network controller 130 may identify the zone in which client 240-$i,j$ is located (Block 520). The identification may be performed by making comparisons of client's 240-$i,j$ position with the boundaries of one or more zones. Once an identified zone is determined, network controller 130 may apply a profile to client 240-$i,j$ which is associated with the identified zone (Block 525). In various embodiments, a profile may be pre-defined and can be associated with one or more zones. The profile may establish rules to access resources within or outside LAN 200. For example, a particular profile may establish rules for controlling one or more network appliances 220 located within the particular zone, receiving information from one or more network appliances 220 within the particular zone, or accessing network services associated with the particular zone.

Network controller 130 may determine a logical network identifier for client 240-$i,j$ based on the zone identified in Block 520. In an embodiment, as will be described in more detail in relation to FIG. 7, network controller 130 may define a unique ranges of Internet Protocol (IP) addresses to each zone, and then ascertain an available IP address from the range of IP addresses associated with the identified zone. Moreover, the process of determining the network identifier may depend on whether a network identifier was previously assigned to client 240-$i,j$ from a zone different from the identified zone. For example, logical network tracker 440 may determine whether a network identifier was previously assigned to a client 240. This may occur if the client 240 transitions or moves between zones over time.

Accordingly, network controller 130 may determine whether a logical network identifier was previously assigned to client 240-$i,j$ (Block 530). When network controller 130 determines that a logical network identifier was not previously assigned to client 240-$i,j$, network controller 130 may wait until a request for a network identifier (e.g., a DHCP request in IPv4) (Block 545). Once a request is received, network controller 130 may then assign a logical network identifier (e.g., an IP address from a range if IP addresses associated with the identified zone) to client 240-$i,j$ (Block 550).

When network controller 130 determines that a logical network identifier was previously assigned to client 240-$i,j$ in Block 530, network controller 130 may associate the previously assigned logical network identifier to the applied profile (Block 535). The network controller 130 may then revoke the previously applied profiles associated with other zones (Block 540).

In an embodiment, network controller 130 may further determine that the client moves from the identified zone to a second zone. Upon making such a determination, network controller 130 may revoke client's 240-$i,j$ assigned logical network identifier and applied profile. Network controller 130 may then apply a second profile associated with the second zone to the client, and subsequently assign a second logical network identifier to the client which is associated with the second zone.

In an embodiment, network controller 130 may partition a group of logical network identifiers into non-overlapping sub-groups. Each sub-group may represent a separate logical network uniquely associated with each zone from the established zones. Network controller 130 may further provide client 240-$i,j$ access to at least one network appliance 220-$i,k$ located within the identified Zone i, and withhold client 240-$i,j$ access to network appliances 220-1,$m$ located in other zones, where client 240-$i,j$ access is based on the applied profile associated with Zone i. The logical network associated with the determined logical network identifier will appear as an isolated network to the client 240-$i,j$ in the identified Zone i, and the logical network will not be detected by any client 240 outside the identified Zone i.

Figure 6:
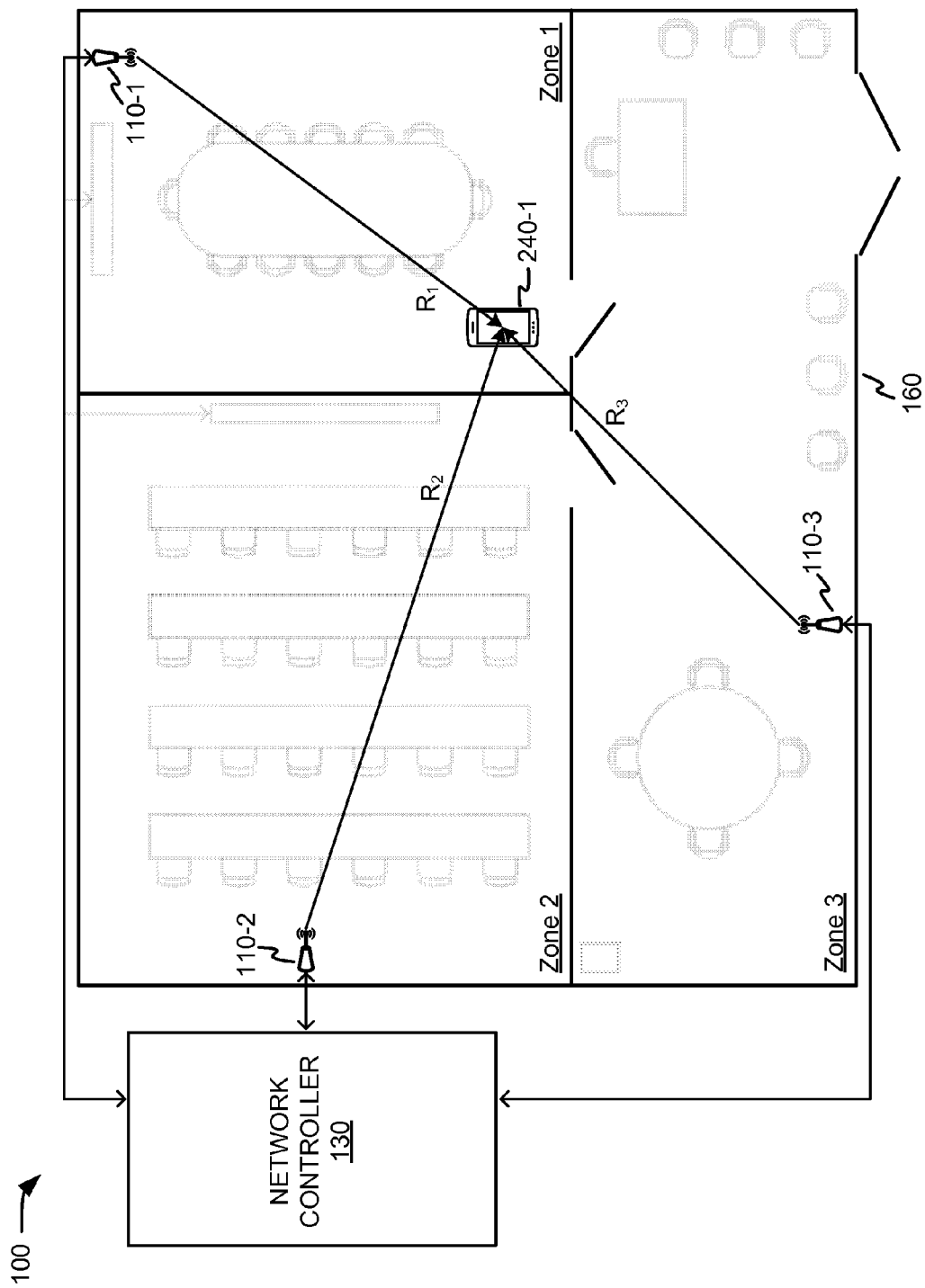
FIG. 6 is a is a diagram illustrating an exemplary technique for determining a position of a client in the environment shown in FIG. 1.

FIG. 6 is a diagram illustrating an exemplary technique for determining a position of an exemplary client 240-1 in environment 100 previously shown in FIG. 1. While the technique illustrated in FIG. 6 only shows one client 240-1, the technique may be performed on all clients 240 in LAN 200, or only a subset thereof. Network controller 130 can determine the position of each client within floor plan 160 using a variety of known techniques, some of which may be combined to improve position accuracy. For example, as shown in FIG. 6, network controller 130 may determine the position of client 240-1 using the infrastructure of the LAN 200, which may include trilateration using wireless APs 110. Alternatively, in other embodiments, the position of client 240-1 may be determined by client 240-1 using, for example, an on-board GPS receiver residing in client 240-1. One determined by the GPS receiver, the position of client 240-1 may be passed on to network controller 130 for further processing. In some embodiments, the GPS positions received from client 240-1 may be used instead of positions derived using the infrastructure of LAN 200. In other embodiments, positions of client 240-1 may be determined using both wireless APs 110 and the on-board GPS receiver within client 240-1, and these positions may be combined (e.g., using Kalman filtering) in network controller 130 to improve accuracy.

Further referring to FIG. 6, the position of client 240-1 may be determined by exploiting the characteristics of the wireless signals transmitted by a plurality of APs 110 to client 240-1. If positions in two dimensions are desired, there must be at least two APs 110 providing wireless signals to perform two dimensional trilateration. If positions in three dimensions are desired, there must be at least three APs 110 proving wireless signals to client 240-1 to perform three dimensional trilateration. In either case, increasing the number of APs 110 beyond the minimums described above will permit using overdetermined solution techniques (e.g., least squares) which may improve position accuracy.

As illustrated in the embodiment shown in FIG. 6, position determination of client 240-1 may use wireless signals exchanged between APs 110-1:3 and client 240-1. Specifically, client 240-1 may transmit probe packets to APs 110-1:3. In response, APs 110-1:3 may respond to the transmitted probe packets and request a response (e.g., an acknowledgement packet). Network controller 130 may analyze the packets received from the APs 110-1:3, and by analyzing time delays and/or the signals strengths of the packets exchanged with APs 110-1:3, network controller 130 may estimate the distances R1, R2, and R3 between client 240-1 and APs 110-1:3, respectively. Once the distances are determined, the position of client 240-1 may be estimated by network controller 130 and the zone in which client 240-1 is located may be identified. As noted above, the response of client 240-1 may take the form of an acknowledgement packet (ACK); however, any type of response packet may be used in the analysis. For example, a request to send (RTS) or and/or a clear to send (CTS) response packet may be suitable for position determination by network controller 130.

Figure 7:
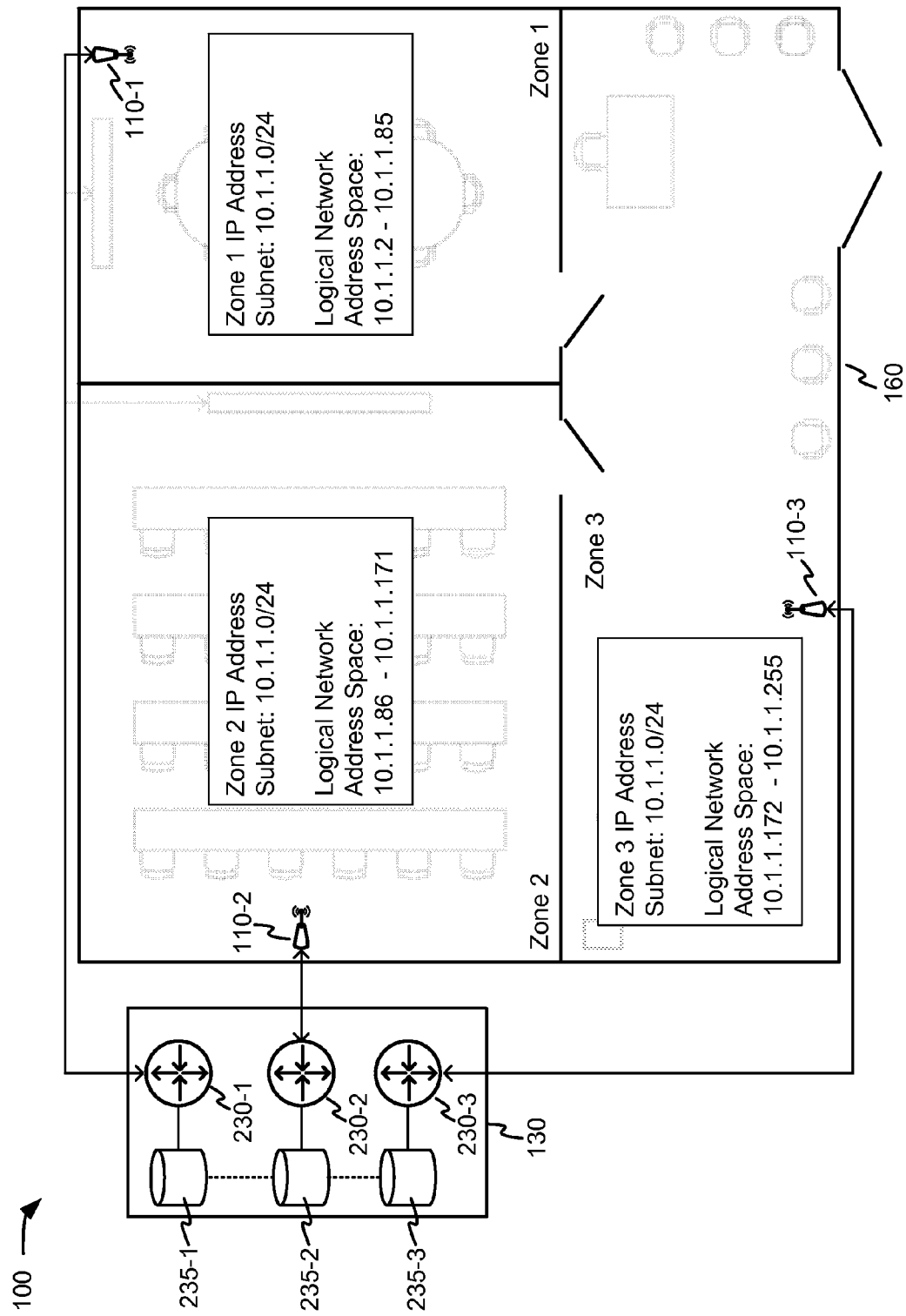
FIG. 7 is a is a diagram illustrating an exemplary approach for assigning logical networks in the form of subnets to zones for the environment shown in FIG. 1.

FIG. 7 is a diagram illustrating an exemplary approach for assigning logical networks for the environment 100 previously shown in FIG. 1. The embodiment shown in FIG. 7 utilizes parameters such as IP address and subnet masks, which may be consistent with IPv4 networking standards, to establish logical networks for the zones. Here, network controller 130 may define unique ranges of IP addresses for each zone. When the location of client 240-$i,j$ is determined and its appropriate zone is identified, network controller 130 may ascertain an available IP address from the range of IP addresses associated with the identified zone. This addressing scheme, which is described in more detail below, logically partitions the networks to provide compartmentalization between zones among clients 240 and network appliances 220.

In environment 100 shown in FIG. 7, exemplary floor plan 160 may be divided into three zones: Zones 1:3. Functionally speaking, network controller 130 may be thought of as using separate routers 230-1:3 and separate DHCP servers 235-1:3 for Zones 1:3, respectively. However, as indicated by the dotted line connecting DHCP servers 235-1:3, network addressing may be obtained from a single network, thus addressing for each zone may be apportioned from a common address space. Separate routers 230-1:3 and DHCP servers 235-1:3 may be thought of as "virtual entities" implemented in software by network controller 130. However, these may in actuality be single entities as seen by the network, and as will be explained below, and thus may be assigned a single IP address in the network. Alternatively or additionally, DHCP servers 235 and routers 230 may include an implementation having a hardware-based DHCP server and/or a hardware-based router.

Accordingly, when designing LAN 200, the "logical" aspects of the network may refer to the IP addressing scheme used within the network. For example, 10.1.0.0/24 could be the network address IP subnet for LAN 200, wherein the network IP address may be 10.1.0.0 with a subnet mask of /24 (255.255.255.0). The network may use a broadcast address of 10.1.0.255. Using the subnet mask configuration of /24 permits a total of 254 assignable IP addresses for Zones 1:3. Note the IP address of the actual router (which incorporates "virtual" routers 230-1:3) takes up an address which may be 10.1.1.1.

Given the above IP address subnet sections, the useable address space may be divided among the zones as appropriate to establish the logical networks. All the Zones 1:3 in floor plan 160 may have an IP Address subnet of 10.1.1.0/24, which thus leaves a range of 254 IP address to be apportioned. For example, as shown in FIG. 7, Zone 1 may be assigned a logical network address space ranging from 10.1.1.2-10.1.1.85. Zone 2 may be assigned a logical network address space ranging from 10.1.1.86-10.1.1.171. Zone 3 may be assigned a logical network address space ranging from 10.1.1.172-10.1.1.255.

Selecting the appropriate IP numbering scheme and subnet mask will determine how many usable IP addresses will be available for the zones within a particular space. In some implementations, overlapping network addresses may be avoided, otherwise, routing problems between clients 240 and/or network appliances 220 may occur.

In other embodiments, logical networks may be defined using different networking layers and/or networking protocols. For example, instead of using IPv4 addressing as shown above, logical networks may be established based on IPv6.

Alternatively, Layer 2 parameters may be employed to establish logical networks. For example MAC addressing and filtering may performed by network controller 130 define logical networks identifiers for each zone. This may be accomplished by enhancing MAC addresses with additional addressing information, such as, for example, as in IEEE 802.1q or IEEE 802.1ad. The additional addressing information may uniquely identify a zone and, given the addressing information is assigned by network entities and not accessible by clients, connectivity only between authorized entities within a zone may be ensured. The address enhancement may be assigned by the AP in a case where traffic from the wireless client is directly sent by the AP to the wired network. In another embodiment, the network arrangement could implement encapsulation, where all traffic exchanged with the APs may go through the network controller and is isolated by the encapsulation. An example implementing such an approach may employ the CAPWAP protocol according to RFC 5415. In such a case, network controller 130 may determine how to process traffic exchanged with clients 240 and, for example, provide the traffic to a dedicated interface for a particular client's 240-$i,j$ respective Zone i.

FIG. 8 is a signal flow diagram 800 showing exemplary messages passed between devices consistent with an embodiment presented herein. The devices shown in signal flow diagram 800 include an exemplary client 240-$i,j$, wireless AP 210-1:N, network controller 130, and network appliance 220-$i,k$. For ease of explanation, messages shown in signal flow diagram 800 are described in relation to a single exemplary client 240-$i,j$ and a single network appliance 220-$i,k$ (where the client and the network appliance shown are in a common zone as indicated by having the same first index "i"). However, it should be noted that the message flows may be performed in association with any number of clients 240 and network appliances 220 within a common zone.

Prior to client 240-$i,j$ associating with any wireless APs 210-1:N and before being admitted to LAN 200 by network controller 130, client 240-$i,j$ may send probe request packets to AP 210-1:N (830) as part of wirelessly associating with the APs 210. APs 210-1:N, upon receiving probe request packets 830, may each transmit probe response packets (835) back to client 240-$i,j$. Client 240-$i,j$ may respond with an ACK packet (837) to APs 210-1:N to complete the association process and establish wireless channels between the client 240-$i,j$ and APs 210-1:N. Packet information (840) describing the packets exchanged between client 240-$i,j$ and APs 210-1:N may be provided to network controller 130. The packet information may include, for example, packet timings and/or signal strength. At this point, network controller 130 may admit client 240-$i,j$ into LAN 200 as part of the standard authentication process (not shown). Using the packet information 840, network controller 130 may determine the position of client 240-$i,j$ and identify the zone, if any, in which it is located (Block 845). Network controller 130 may apply a profile and logical network identifier (e.g., an IP address) based on the identified zone (Block 850). Network controller 130 may then provide the applied profile and assigned logical network identifier (855) to client 240-$i,j$ through any one of APs 210-1:N. Client 240-$i,j$ may then communicate with network appliance 220-$i,k$ by exchanging data and/or control packets (860). Client 240-$i,j$ may further exchange data and/or control packets (865) with external resources 280, which may include devices over the Internet. For example, client 240-$i,j$ may access resources (e.g., any type of network appliance, input device, output device, cloud server, etc.) without having to be manually configured to identify the resources, whether they are within a particular zone or external resources 280 outside of the zones. That is, client device 240-$i,j$ may automatically be able to access various resources within zones and/or external resources 280.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while a series of blocks has been described with respect to FIG. 5 and signal flows with respect to FIG. 8, the order of the blocks and signal flows may be modified in other implementations. Further, non-dependent blocks and signal flows may be performed in parallel.

It will be apparent that different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code. It being understood that software and control hardware can be designed to implement these aspects based on the description herein.

Further, certain portions of the invention may be implemented as a "component" or "system" that performs one or more functions. These components/systems may include hardware, such as a processor, an ASIC, a FPGA, or other processing logic, or a combination of hardware and software.

To the extent the aforementioned embodiments collect, store or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise.

What is claimed is:

1. A method, comprising:
   determining a position of a client;
   determining whether the client is located inside one zone from a plurality of established zones based on the determined position of the client;
   identifying a zone in which the client is located upon determining that the client is located inside one zone from the plurality of established zones;
   applying a profile associated with the identified zone to the client; and
   determining a logical network identifier for the client based on the identified zone, wherein determining the logical network identifier comprises:
      defining unique ranges of Internet Protocol (IP) addresses for each zone and,
      ascertaining an available IP address from the ranges of IP addresses associated with the identified zone.

2. The method of claim 1, further comprising:
   partitioning a group of logical network identifiers into non-overlapping sub-groups, wherein each sub-group represents a separate logical network uniquely associated with one zone from the plurality of established zones; and
   providing client access to at least one network appliance located within the identified zone, and withholding client access to network appliances located in other zones, wherein the client access is based on the applied profile.

3. The method of claim 1, wherein a logical network associated with the determined logical network identifier will appear as an isolated network to the client in the identified zone, and the logical network will not be detected by any client outside the identified zone.

4. The method of claim 1, wherein determining a logical network identifier comprises:
   determining that a logical network identifier was not previously assigned to the client;
   receiving a request for a network identifier from the client; and
   assigning the logical network identifier to the client.

5. The method of claim 1, further comprising:
   applying a guest profile to the client in response to determining the client is not located in any zone from the plurality of established zones.

6. The method of claim 1, wherein determining a logical network identifier comprises:
   determining that a logical network identifier associated with the identified zone was previously assigned to the client;
   associating the previously assigned logical network identifier to the applied profile; and
   revoking previously applied profiles associated with other zones.

7. The method of claim 4, further comprising:
   determining the client has moved from the identified zone to a second zone;
   revoking the assigned logical network identifier and applied profile associated with the client;
   applying a second profile associated with the second zone; and
   assigning a second logical network identifier associated with the second zone.

8. The method of claim 1, wherein determining a position of the client comprises:
   receiving packets from the client at a plurality of wireless access points;
   transmitting packets to the client from the plurality of wireless access points; and
   locating the position of the client based on at least one of time delays or signal strengths associated with at least one of the transmitted packets or the received packets.

9. The method of claim 1, further comprising:
   receiving information to define a location for each zone in the plurality of established zones, wherein the location is associated with at least one of a classroom, a conference room, a briefing room, a waiting room, a medical treatment room, a manufacturing area, an access controlled area, a maintenance area, an apartment or condominium, an area within or around vehicles, a food service establishment, an airport, a waiting area, a museum, or a tourist attraction.

10. The method of claim 4, further comprising:
    defining profiles associated with the zones within the plurality of established zones, wherein a particular profile establishes rules to access resources when the client is within a particular zone associated with the particular profile.

11. The method of claim 10, wherein defining profiles further comprises:
    establishing rules for at least one of controlling a network appliance located within the particular zone, receiving information from the network appliance located within the particular zone, or accessing network services associated with the particular zone.

12. A device, comprising:
    a memory to store instructions; and
    a processor, coupled to the memory, configured to execute the instructions stored in memory to:

determine a position of a client, determine whether the client is located inside one zone from a plurality of established zones based on the determined position of the client, identify a zone where the client is located in response to determining that the client is located inside one zone from the plurality of established zones, apply a profile to the client which is associated with the identified zone, and determine a logical network identifier for the client based on the identified zone, wherein the instructions to determine the logical network identifier further cause the processor to:

define unique ranges of Internet Protocol (IP) addresses for each zone, and ascertain an available IP address from the ranges of IP addresses associated with the identified zone.

13. The device of claim 12, wherein the instructions further cause the processor to:

partition a group of logical network identifiers into non-overlapping sub-groups, wherein each sub-group represents a separate logical network uniquely associated with one zone from the plurality of established zones; and provide client access to at least one network appliance located within the identified zone, and withhold client access to network appliances located in other zones, wherein the client access is based on the applied profile.

14. The device of claim 12, wherein a logical network associated with the determined logical network identifier will appear as an isolated network to the client in the identified zone, and the logical network will not be detected by any client outside the identified zone.

15. The device of claim 12, wherein the instructions to determine a logical network identifier cause the processor to:

determine that a logical network identifier was not previously assigned to the client, receive a request for a network identifier from the client, and assign the logical network identifier to the client.

16. The device of claim 15, wherein the instructions cause the processor to:

determine the client has moved from the identified zone to a second zone, revoke the assigned logical network identifier and applied profile associated with the client, apply a second profile associated with the second zone, and assign a second logical network identifier associated with the second zone.

17. The device of claim 12, wherein the instructions cause the processor to:

apply a guest profile to the client in response to determining the client is not located in any zone from the plurality of established zones.

18. The device of claim 12, wherein the instructions to determine a logical network identifier cause the processor to:

determine that the logical network identifier was previously assigned to the client, associate the previously assigned logical network identifier to the applied profile, and revoke previously assigned logical network identifier for other profiles in the plurality of established zones.

19. The device of claim 12, wherein the instructions to determine a position of the client further cause the processor to:

receive packets from the client at a plurality of wireless access points, transmit packets to the client from the plurality of wireless access points, and locate the position of the client based on at least one of time delays or signal strengths associated with at least one of the transmitted packets or the received packets.

20. The device of claim 12, wherein the instructions further cause the processor to:

receive information to define a location for each zone in the plurality of established zones, wherein the location is associated with at least one of a classroom, a conference room, a briefing room, a waiting room, a medical treatment room, a manufacturing area, an access controlled area, a maintenance area, an apartment or condominium, an area within or around vehicles, a food service establishment, an airport, a waiting area, a museum, or a tourist attraction.

21. The device of claim 12, wherein the instructions further cause the processor to:

define profiles associated with the zones within the plurality of established zones, wherein a particular profile establishes rules to access resources when the client is within a particular zone associated with the particular profile.

22. The device of claim 21, wherein the instructions to define profiles cause the processor to:

establish rules for at least one of controlling a network appliance located within the particular zone, receive information from the network appliance located within the particular zone, or access network services associated with the particular zone.

23. A non-transitory computer-readable medium comprising instructions, which, when executed by a processor, cause the processor to:

determine a position of a client, determine whether the client is located inside one zone from a plurality of established zones based on the determined position of the client, identify a zone where the client is located in response to determining that the client is located inside one zone from the plurality of established zones, apply a profile to the client which is associated with the identified zone, and determine a logical network identifier for the client based on the identified zone, wherein the instructions to determine the logical network identifier cause the processor to:

define unique ranges of Internet Protocol (IP) addresses for each zone, and ascertain an available IP address from the ranges of IP addresses associated with the identified zone.

24. The method of claim 1, wherein the established zones are defined based on boundaries having locations described by position data.

25. The device of claim 12, wherein the established zones are defined based on boundaries having locations described by position data.

* * * * *